Nov. 26, 1968   M. M. SCHUSTER   3,412,774

SAFETY BOLT

Filed July 29, 1966

INVENTOR.
MICHAEL M. SCHUSTER
BY
ATTORNEYS.

United States Patent Office 3,412,774
Patented Nov. 26, 1968

3,412,774
SAFETY BOLT
Michael M. Schuster, Inglewood, Calif., assignor to Hi-Shear Corporation, Torrance, Calif., a corporation of California
Filed July 29, 1966, Ser. No. 568,511
1 Claim. (Cl. 151—69)

ABSTRACT OF THE DISCLOSURE

This invention relates to a safety bolt of the class which has an expansible spring washer, together with means carried by a bolt member for compressing the same in order that the said means and the snap ring may both pass freely through a workpiece, the snap ring being released by said means so as to maintain the bolt in its installed condition.

---

This invention relates to a safety bolt.

There is a class of bolt which is utilized in linkages, especially in aircraft where devices such as fuel tanks and the like are attached by the bolt, and it is desirable to be certain that the devices do not fall off in flight should the mechanic fail to apply a nut to the bolt. It is evident that some means which would keep a shear bolt from falling out of its hole is desirable in such installations, even though optimum strength characteristics of the joint may not be achieved. Experience has shown that a bolt which cannot readily be installed without providing for its retention whether or not the nut is applied is a desirable product, and it is an object of this invention to provide the same.

There have been previous efforts to provide such safety bolts, but in general they have relied on snap rings and the like which required the bolt to be hammered into relatively fragile mechanisms, compression of the ring being indirectly caused by the blows. Many devices are attached with bolts to members such as sheets and flanges which themselves are rather thin. In such case, impacting forces may deform the structure. Of equal significance is the fact that hammering may not be possible due to close quarters. It is a further object of this invention to provide a safety bolt in which the bolt may be inserted without percussive or other strong forces felt by surrounding structure.

A device according to this invention includes in combination a bolt which has a shank that has an outer diameter. A thread is provided on the bolt which has a crest diameter smaller than the shank diameter. A land is formed between the thread and the shank. A lock ring surrounds the land and has a lateral dimension which, when the ring is relaxed, is greater than the shank diameter and which is no greater than the shank diameter when the ring is compressed. A taper is formed on the side of the ring facing the thread, which taper extends outwardly as it approaches the shank. A bushing is provided whose greatest outer dimension is no greater than the shank diameter. The bushing can then be passed through any hole the shank passes through. A central passage is formed in the bushing which is adapted to fit over the thread. Engagement means is carried by the bushing to engage the bolt, and a taper in the central passage is adapted to engage the taper on the ring so as to compress the ring when the bushing is forced toward the shank. The bushing can thereby compress the ring and be passed with the ring through a hole in the body, and the bushing can thereafter be removed to enable the ring to relax and spring outwardly to hold the bolt in the hole.

According to a preferred but optional feature of this invention, the bush is colored a distinctive color so as to indicate its presence, thereby to guard against its inadvertently being left in place after the bolt is inserted in the hole in the body.

According to still other preferred but optional features of the invention, the engagement means may comprise a thread in the central passage to engage the thread on the bolt, or alternatively the bolt may have a transverse recess therein (one of which is customarily provided for cotter pins) and in which the bushing includes a cam shaft facing into the central passage, the engagement means comprising a pin engageable in the recess and in the slot whereby rotation of the bushing causes the bushing to shift axially.

The above and other features of this invention will be fully understood from the following detailed description and the accompanying drawings in which.

Figure 1:
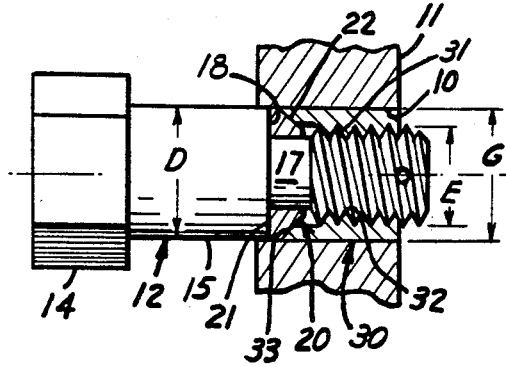
FIG. 1 is a side elevation partly in cutaway cross-section showing the presently preferred embodiment of the invention in the process of being installed in a hole in a body.

The presently preferred embodiment of the invention is shown in FIG. 1 being installed in a hole 10 formed in a body 11, the hole being round and having a diameter. A bolt 12 has an axis 13 and a head 14. Adjacent to the head is a shank 15 which has an outer diameter D. At the end of the bolt opposite the headed end is an external thread 16 having a crest diameter E which is less than diameter D. Between the shank and the thread is a land 17 which preferably, although not necessarily, is a cylindrical section bounded on its left side in FIG. 1 by a flat shoulder 18, and on the right by the thread, the land serving to space apart the shank and the thread.

Figure 3:
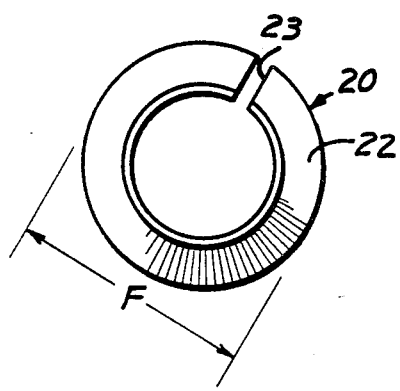
FIGS. 3 and 4 are plan views of two types of lock rings useful in the device of FIG. 1.

A lock ring 20 surrounds the land and includes a flat surface 21 and a taper 22, the taper facing toward the thread and extending outwardly as it extends away therefrom. Flat surface 21 is adapted to engage flat shoulder 18. A simple embodiment of lock ring 20 is shown in FIG. 3, which comprises a ring with a split 23, the ring being sprung outward as to be out of round. The ring is shown in FIG. 3 in its relaxed condition so that it has a transverse dimension F which is larger than dimension D. As shown in FIG. 1, the ring may be compressed so as to return to a substantially circular form and fit within the diameter D in accordance with known lock ring considerations.

Figure 2:
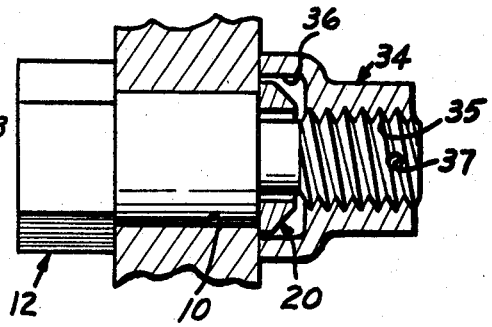
FIG. 2 is a side elevation partly in cutaway cross-section showing the device of FIG. 1 completely installed.

As can best be seen in FIG. 2, when the transverse dimension F is permitted by relaxation of the ring, it extends not only beyond dimension D but also over the back side of the hole in hole 10, thereby to retain the bolt against removal from the hole by virtue of the engagement of the right-hand side of the lock ring with the thread.

Figure 4:
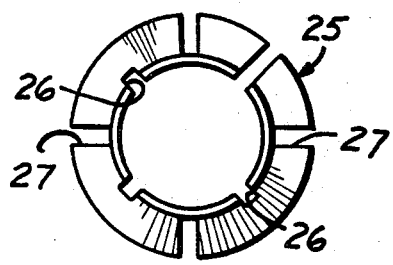

FIG. 4 illustrates a modification of lock ring 20 showing a lock ring 25 which may be used in place of the embodiment of FIG. 1. This ring is modified so as to reduce the force needed to compress the lock ring. The lock ring includes the same taper and flat surface as ring 20, but includes internal reliefs 26 and external reliefs 27 which reduce the cross-section and thereby the force needed to deform the lock ring.

In FIG. 1, there is shown a bushing 30 which comprises a generally round body with an outer diameter G which is less than the outer diameter D so that it may enter any hole the shank enters. There is a central passage 31 opening on one end thereof, and engagement means 32 comprising a thread for engagement with thread 16. A taper 33 opens outwardly from the central passage. By tightening down the bushing on thread 16, the tapers engage each other and cause the ring to contract to the condition shown in FIG. 1 whereby the assembly shown in FIG. 1 may be passed through a hole 10.

In FIG. 2, a castellated nut 34 is shown substituted for the bushing. The castellated nut includes thread 35 and a counterbore 36, the counterbore clearing the lock ring in the relaxed condition. A cotter pin (not shown) may be passed through a transverse relief 37, if desired. Note that if the castellated nut were forgotten, the lock ring would still prevent the withdrawal of the nut.

The outside surface of the bushing may be colored red, yellow, or some other distinctive color so that its presence is evident in the event a mechanic fails to remove the same after it is passed through hole 10. Either of the lock rings of FIGS. 3 and 4 may be utilized in the embodiment of FIG. 1.

Figure 5:
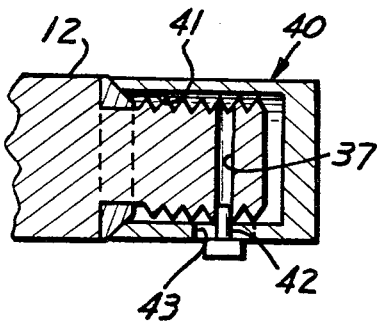
FIG. 5 is a fragmentary axial cross-section showing an alternate embodiment of a portion of the invention.
Figure 6:
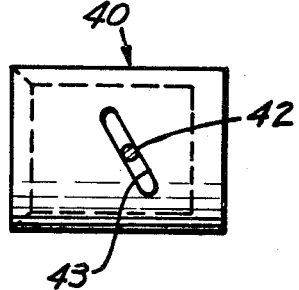
FIG. 6 is a bottom view of FIG. 5.

FIGS. 5 and 6 show an alternate embodiment of a bushing. This bushing 40 (which may be substituted for bushing 30) has a smooth bore 41 instead of internal threads 32. Pin 42 is engageable in the transverse relief 37 and also in a cam slot 43 formed in the wall of the bushing which spirals relative to the central axis. It will thereby be seen that when it is desired to advance bushing 40 along the axis, the pin is placed in the cam slot and in relief 37 and the bushing will then advance as it is turned because of the reaction between the pin and the cam slot.

The operation of all embodiments should be evident from the foregoing. The bushing may readily be passed through the hole while holding the lock pin compressed. After it has reached the back side of the hole, the bushing may be released and the lock ring will spring over the back, holding the pin in place even if a nut is not thereafter attached. The brilliant color of the bushing will call attention to any failure to remove the bushing itself. It is to be understood that means other than split rings may be provided such as deformable rings which change cross-sectional shape instead of plan shape.

This invention is not to be limited by the embodiments shown in the drawings and described in the description which are given by way of example and not of limitation, but only in accordance with the scope of the appended claim.

I claim:

1. In combination: a bolt having a shank with an outer diameter, a thread having a crest diameter less than said shank diameter, and a land between the thread and the shank; a lock ring comprising a snap ring surrounding said land having a lateral dimension which when the ring is relaxed is greater than the shank diameter, and which is less than the shank diameter when the ring is compressed, and a taper on the side of the ring facing the thread, which taper extends outwardly as it approaches the shank; and a bushing having an outer dimension which is no greater than the shank diameter, an internally threaded central passage in said bushing threaded to the thread on the bolt, and a taper in the central passage adapted to engage the taper on the ring and compress the ring when the bushing is threaded toward the shank, whereby the bushing can compress the ring and be passed with the ring through a hole in a body, and the bushing thereafter removed to enable the ring to relax and spring outwardly to hold the bolt in the hole.

References Cited
UNITED STATES PATENTS

| 1,325,177 | 12/1919 | Strohecker | 29—222 |
| 2,278,217 | 3/1942 | Rodanet | 85—70 |
| 2,478,508 | 8/1949 | Simpson | 85—8.8 |
| 2,643,573 | 6/1953 | Johnson | 151—69 |
| 3,137,336 | 6/1964 | Wing | 151—69 |
| 3,138,188 | 6/1964 | Tuozzo et al. | 151—69 |
| 1,375,671 | 4/1921 | Cerf | 151—69 |

FOREIGN PATENTS 417,895  10/1934  Great Britain.

EDWARD C. ALLEN, *Primary Examiner.*